April 4, 1950 G. L. LEITHISER, JR 2,502,860
METHOD OF JOINING COMPONENT PARTS OF PLASTIC ARTICLES
Filed Feb. 11, 1947 2 Sheets-Sheet 1
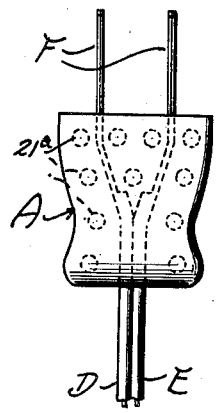
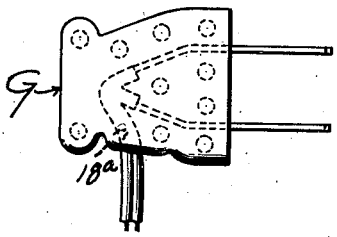
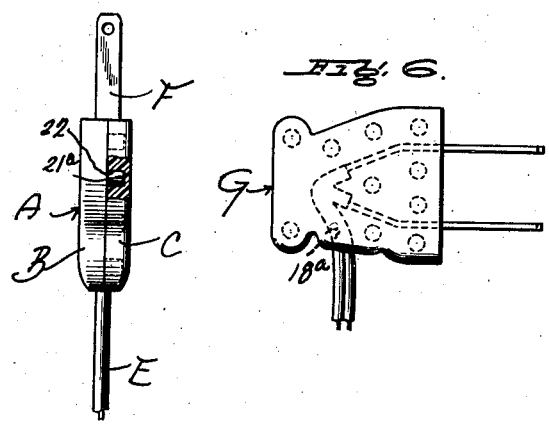
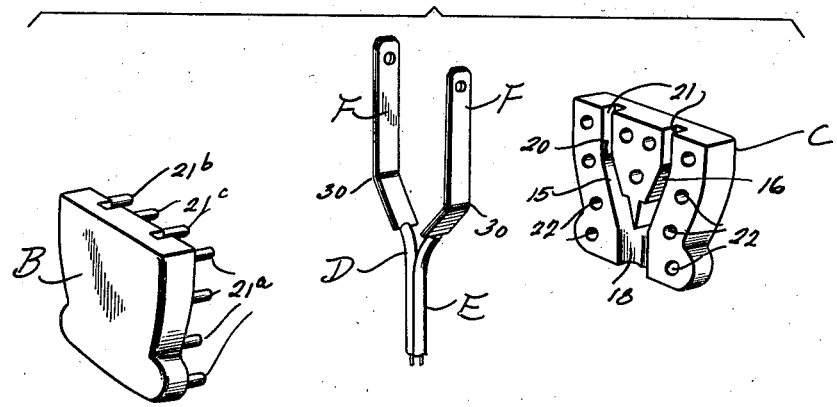
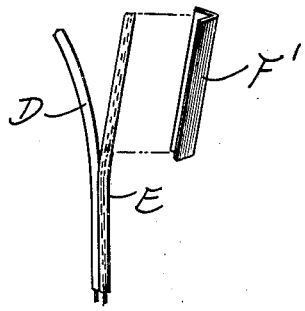
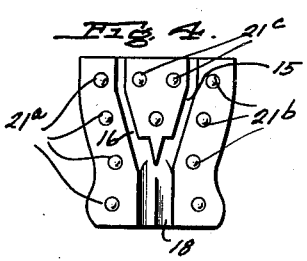
INVENTOR.
George L. Leithiser, Jr.
BY
ATTORNEYS.

April 4, 1950          G. L. LEITHISER, JR          2,502,860
METHOD OF JOINING COMPONENT PARTS OF PLASTIC ARTICLES
Filed Feb. 11, 1947          2 Sheets-Sheet 2
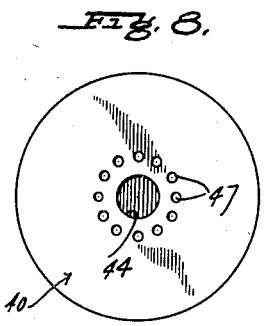
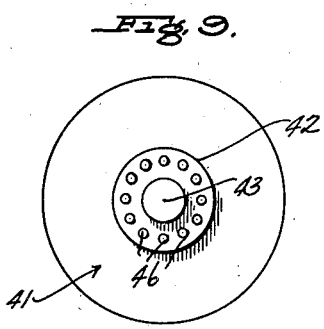
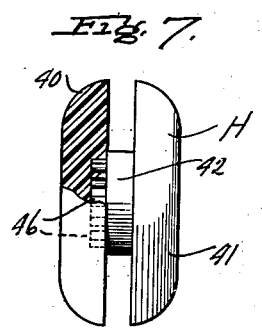
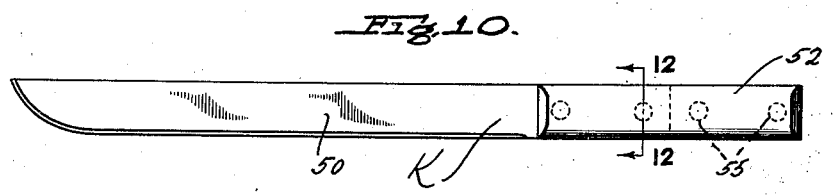
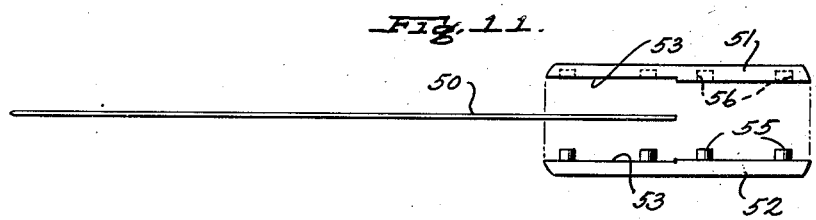
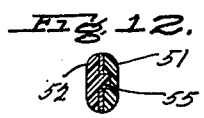
INVENTOR.
George L. Leithiser, Jr.
BY
ATTORNEYS.

Patented Apr. 4, 1950

2,502,860

UNITED STATES PATENT OFFICE 2,502,860

METHOD OF JOINING COMPONENT PARTS OF PLASTIC ARTICLES

George L. Leithiser, Jr., York, Pa.

Application February 11, 1947, Serial No. 727,774

3 Claims. (Cl. 18—59)

This invention relates to improvements in methods for joining together the component plastic parts of an article of manufacture.

A further object of this invention is the provision of improved economical means for efficiently and rapidly assembling a plurality of plastic parts making up some article of manufacture.

A further object of this invention is the provision of an improved method for joining together the synthetic organic plastic parts of devices such as electric plugs, knife handles, drawer pulls, picture frames, and toys such as yo-yo and play blocks.

A further object of this invention is the provision of an improved method of assembling together a plurality of component parts of a variety of devices where at least one of the parts consists of a thermosetting or thermoplastic material.

Other objects and advantages of the invention will be apparent from the following detailed description.

In the accompanying drawings, forming a part of this specification, and wherein similar reference characters designate corresponding parts thruout the several views, Figure 1 is a side elevation of an improved electric plug.

Figure 2 is an edge elevation, partly in section, of the plug of Figure 1.

Figure 3 is a developed view showing the component parts of the electric plug of Figure 1.

Figure 4 is an inside view of one of the parts of the electric plug shown in Figure 3.

Figure 5 is a perspective developed view showing a step in the process of applying a contact terminal to an electric conducting wire.

Figure 6 is a modified form of electric plug.

Figure 7 is an edge elevation, partly in section, of a plastic yo-yo formed according to this invention.

Figures 8 and 9 are inside views of the two component parts of the yo-yo of Figure 7.

Figure 10 is a side elevation of a knife having a plastic handle manufactured according to this invention.

Figure 11 is a developed view showing the component parts of the handle of the knife of Figure 10.

Figure 12 is a cross sectional view taken thru the plastic handle of the knife shown in Figure 10, substantially on the line 12—12 of Figure 10.

In the drawings, wherein for the purpose of illustration are shown different forms and articles which may be manufactured and assembled according to the inventions of the present application, the letter A may generally designate the preferred type of electric plug consisting of male and female plastic casing parts B and C having conductors D and E associated therewith, and provided with improved terminals F. The principles of manufacture and assemblage are applicable to a wide variety of products and articles of manufacture and one or more of the parts is formed of a synthetic organic plastic. Among such products are those of the modified form of electric plug G shown in Figure 6; yo-yo H illustrated in Figures 7, 8 and 9 and knife K illustrated in Figures 10, 11 and 12.

The parts of the various articles herein referred to as of plastic manufacture may consist of any of the well known synthetic organic materials, either thermosetting or thermoplastic.

Referring to the electric plugs A and G, the same consist of casing parts, such as the parts B and C for the plug A, having upon the inside faces thereof terminal receiving slots 15 and 16 with their juncture at the wire receiving opening 18 which outlets upon an edge of each part; the slots 15 and 16 being appropriately spaced and diverging from the wire outlet 18 to points 20 where the same extend in parallelism at 21 to the point where they outlet upon the edge of the casing part. In the form of plug G the wire slots 18ª open upon the side edge of the casing whereas in the form of plug A the wire slots 18 open upon the bottom end edge of the plug opposite the terminal outlets 21. The part B is provided with a plurality of pins 21ª projecting normal to the inside face of the plug spaced from one side margin thereof; another row or series of pins 21ᵇ in the same relation along the opposite side edge of the part B, and a series of like pins 21ᶜ on the face of the plug between the terminal slots 15 and 16.

The plastic part C is provided on the inside face thereof with complementary sockets 22 for the pins 21ª, 21ᵇ and 21ᶜ of the part B. While I do not intend to limit myself to any particular cross section or length of pin or stud, the cross sectional dimensions of the sockets 22 are the same individually as the cross sectional dimensions of the pins which they receive. Thus, in the case of the socket of circular cross section the diameter would be the same as the pin which it receives. At normal temperature, or if the parts B and C are of the same temperature, it would be impossible to assemble the pins in the sockets. However, by relatively varying the temperatures of the two parts, the parts can be assembled by fitting the pins in the sockets, so that when the parts reach normal temperature or the same temperatures the plugs will be expanded in the sockets or vice versa, and the sockets will contract upon the pins in order to permanently hold the parts together. The preferred method is that of heating the part C having sockets for the purpose of expanding the diameters of the sockets so the pins of the other part can be readily assembled therein. Of course this could also be accomplished by lowering the temperature of the part B and permitting the part C to remain at normal temperature.

While the above comprises the broad idea of joining together the component parts of different articles of manufacture where at least one of the parts is formed of a synthetic organic plastic, there are other structural features of the plugs A and G which enable the same to be economically fabricated with rapid assembly to provide a safe high quality plug. Thus the conductors D and E which enclose conductive wire, preferably copper, are coated with some insulating plastic having rubber-like properties, such as synthetic plastic, which under the influence of heat will readily flow from the wire. The terminal pieces F consist of bendable strips of conducting metal normally V-shaped in cross section, such as shown at F' in Figure 5 of the drawings. The end of the conductor D or E, as the case may be, is assembled in the V-shaped depression of the strip F¹; the latter having been heated or then subjected to heat and pressure. This will cause the thermoplastic insulation to extrude from the closing facing surfaces of the strip and sufficient pressure having been applied, the strip walls will then engage in intimate conducting contact with the copper wire and will flatten it therebetween with a permanent assemblage. This idea of applying terminals to the conductors D and E insures that no portion of the wire D and E will be exposed, so that it is possible to have the insulation of the conductors D and E extending entirely thru the socket 18 of the parts B and C by projecting slightly upwardly into the terminal passageway 15 and 16. There will thus be little liability of the plug short circuiting. The clips F are of bendable material and may be crimped as shown at 30 in the drawings so as to fit in the diverging and parallel portions of the terminal slots 15 and 16 above described.

The only variation between the plugs A and G is the fact that the conductors outlet upon the side edge of the plug G in lieu of the end outlet shown for the plug A.

Referring to the plastic yo-yo H in Figures 7, 8 and 9, the same consists of the parts 40 and 41; the latter having a hub 42 cast integral therewith and the centering stud 43 adapted to fit in the socket 44 of the part 40. An annular series of connecting pins 46 are arranged normal to the face of the hub 42 adapted to interfit in the companion sockets 47 of the part 40. The dimensional characteristics and mode of assembly of the stud 43 within its socket 44 and the pins 46 within the sockets 47, follow the teaching for the electric plug above described, so that it is not necessary to have any independent connecting screws, bolts or glues for the assemblage of the parts of the yo-yo.

With respect to the knife K, the same includes the cutting blade 50 which may be of any shape, and the handle structure includes the parts 51 and 52 respectively recessed on the faces at 53 to receive the blade 50. The part 52 has the plastic studs or pins 55 adapted to seat respectively in the sockets 56 of the plastic part 51 as shown in Figure 12. It is of course understood that the nature of the plastic parts 51 and 52 and the mode of connection thru the studs and sockets follow the practice outlined in connection with the plug A above described.

It is of course understood that the pins are integral with the various parts of the articles above described, and it is not necessary to provide any other connecting expedients than that of the pins and sockets for the assemblage of the component parts of the articles.

The articles herein described are typical of a large variety of articles which can be assembled and joined together after the improved means and method herein described. It is thus possible to join together a plurality of plastic component parts of articles such as drawer knobs; drawer pulls and handles; picture frames; toys such as building blocks and the plastic portions of desk sets and pen holders. It is even possible to join a single plastic part to some other part of an article thru variation in temperature of the parts. For instance, it would be possible to join a synthetic organic plastic part having studs or sockets to a metal, marble or a part of other material having complementary sockets or pins, as the case may be.

Various changes in the steps of the method herein outlined, as well as changes in the shape, size and arrangement and application of parts may be made to the forms of invention herein shown and described without departing from the spirit of the invention or the scope of the claims.

I claim:

1. The method of assembling electrically conductive terminal pieces upon electrical conducting wires wherein the wires are coated with thermoplastic material which includes applying the conductor terminal piece upon the thermoplastic coated conductor with the application of heat and pressure sufficient to cause displacement of the thermoplastic material from the conductor in the vicinity of the terminal and the electrical contact of the conductor with the terminal.

2. The method of assembling a bendable electrically conductive terminal piece upon a thermoplastic insulated conducting wire which includes placement of the thermoplastic coated wire within the electrically conductive terminal piece and applying heat and pressure to the terminal piece for extruding the thermoplastic coating from the conductor wire in the vicinity of the terminal piece until the wire and terminal piece are in electrical contact.

3. The method of assembling a bendable terminal clip upon an insulation coated conducting wire wherein the terminal clip is provided with relatively connected parts adapted to lie on opposite sides of the conductor, which includes applying the insulation coated wire between the parts of said terminal clip and applying heat and pressure upon the parts of the terminal clip to extrude the insulation covering from between the parts of the terminal and establish electrical contact between the clip parts and the wire.

GEORGE L. LEITHISER, Jr.

REFERENCES CITED

The following references are of record in the file of this patent:

UNITED STATES PATENTS

| Number | Name | Date |
|---|---|---|
| 343,665 | Leiter | June 15, 1886 |
| 1,161,193 | Cook | Nov. 23, 1915 |
| 1,410,651 | Caps | Mar. 28, 1922 |
| 1,919,455 | Wilson | July 25, 1933 |
| 2,062,880 | Hansen | Dec. 1, 1936 |
| 2,211,102 | Davis | Aug. 13, 1940 |
| 2,272,432 | Rogie | Feb. 10, 1942 |
| 2,284,392 | Heiser | May 26, 1942 |